(12) United States Patent
An et al.

(10) Patent No.: US 11,912,434 B2
(45) Date of Patent: Feb. 27, 2024

(54) DRONE HAVING COLLISION PREVENTION AND RECOVERY FUNCTION

(71) Applicants: Byeong Yeol An, Changwon-si (KR); Jeong Woo An, Changwon-si (KR)

(72) Inventors: Byeong Yeol An, Changwon-si (KR); Jeong Woo An, Changwon-si (KR)

( * ) Notice: Subject to any disclaimer, the term of this patent is extended or adjusted under 35 U.S.C. 154(b) by 406 days.

(21) Appl. No.: 17/284,089

(22) PCT Filed: Oct. 21, 2019

(86) PCT No.: PCT/KR2019/013831
§ 371 (c)(1),
(2) Date: Apr. 9, 2021

(87) PCT Pub. No.: WO2020/080911
PCT Pub. Date: Apr. 23, 2020

(65) Prior Publication Data
US 2021/0347497 A1 Nov. 11, 2021

(30) Foreign Application Priority Data
Oct. 19, 2018 (KR) .................. 10-2018-0124953

(51) Int. Cl.
*B64D 45/00* (2006.01)
*B64U 10/13* (2023.01)
(Continued)

(52) U.S. Cl.
CPC ............ *B64D 45/04* (2013.01); *B64C 39/024* (2013.01); *B64D 2045/0085* (2013.01); *B64U 10/13* (2023.01); *B64U 2201/10* (2023.01)

(58) Field of Classification Search
CPC ........... B64D 45/04; B64D 2045/0085; B64D 45/00; B64C 39/024; B64U 10/13; B64U 2201/10; B64U 50/19
See application file for complete search history.

(56) References Cited

U.S. PATENT DOCUMENTS 6,086,015 A * 7/2000 MacCready, Jr. ..... B64C 39/024
244/45 R
10,787,275 B2 * 9/2020 Huth .................... G01M 5/0041
(Continued)

FOREIGN PATENT DOCUMENTS

KR 10-1585650 B1 1/2016
KR 10-2017-0059853 A 5/2017
(Continued)

*Primary Examiner* — John A Tweel, Jr.
(74) *Attorney, Agent, or Firm* — KORUS Patent, LLC; Seong Il Jeong (57) ABSTRACT

The present invention relates to a drone. The drone includes a main body, a plurality of blades, a plurality of driving motors, a power supply unit, a control unit, a plurality of sensors, and a plurality of switch units, and the switch units are connected to turn on and off power supplied to the driving motor that drives a blade corresponding to the sensor so that the main body does not collide with the obstacle. The blades are mounted on the main body. The driving motors correspond to the respective blades. The power supply unit supplies power. The control unit controls power. The sensors are installed to correspond to the respective blades. The switch units receive a signal detected by one of the sensors and turn on and off the direct supply of power to a corresponding one of the driving motors.

4 Claims, 6 Drawing Sheets

(51) Int. Cl.
 *B64D 45/04* (2006.01)
 *B64C 39/02* (2023.01)

(56) References Cited

U.S. PATENT DOCUMENTS

| | | | |
|---|---|---|---|
| 2012/0271491 A1 | 10/2012 | Spata | |
| 2017/0106986 A1 | 4/2017 | Sweeny et al. | |
| 2019/0009893 A1* | 1/2019 | Toyama | B64B 1/02 |
| 2019/0047702 A1* | 2/2019 | Chen | B64D 45/00 |
| 2019/0315465 A1* | 10/2019 | Liu | B64C 39/024 |
| 2021/0269143 A1* | 9/2021 | Nishio | B64C 39/024 |

FOREIGN PATENT DOCUMENTS

| | | |
|---|---|---|
| KR | 10-2018-0075111 A | 7/2018 |
| WO | 2017/154421 A1 | 9/2017 |

\* cited by examiner

FIG. 6 ical Field

The present invention relates to a drone, and more particularly to a drone having a collision prevention and recovery function, which may prevent a collision with an obstacle regardless of a remote control signal during flight and may be safely recovered through the transmission of a specific signal to the drone.

BACKGROUND ART

A drone is an unmanned aerial vehicle that has a plurality of blades and is controlled by a remote control device. Drones can be reduced in their size and weight, so that they are developed and used for various purposes, such as the monitoring or photographing of places or work environments that are difficult to access. In recent years, as drones are widely distributed for personal hobbies, the demand for drones is also continuously increasing.

Unmanned aerial vehicles such as drones fly according to wireless control through a remote control, or fly along self-programmed paths. However, drones fly in various environments and terrains. Accordingly, when a user's inadequate control or communication failure occurs or an abnormality occurs in a central control unit that controls a drone, there may occur an accident in which the drone collides with a nearby building or obstacle. Furthermore, when the drone is moved out of the range of remote control, there occur cases where flight may be impossible due to difficulty in control attributable to various obstacles and unexpected damage may occur due to collision with various obstacles, so that safety-related problems and property damage occur.

Korean Patent No. 10-1585650 (registered on Jan. 8, 2016)
Korean Patent Application Publication No. 10-2017-0059853 (published on May 31, 2017)
Korean Patent No. 10-1895343 (registered on Aug. 30, 2018)

DISCLOSURE

Technical Problem

The present invention is intended to overcome the above-described problems. An object of the present invention is to provide a drone that may detect an obstacle and prevent a collision by itself regardless of a user's remote control signal and a central control device.

Furthermore, an object of the present invention is to provide a drone that may be safely recovered through the transmission of a specific signal to the drone when it is moved out of the range of flight or a problem with control occurs.

Technical Solution

A drone according to the present invention includes a main body, a plurality of blades, a plurality of driving motors, a power supply unit, a control unit, a plurality of sensors, and a plurality of switch units, and the switch units are connected to turn on and off power supplied to the driving motor that drives a blade corresponding to the sensor so that the main body does not collide with the obstacle. The blades are mounted on the main body. The driving motors correspond to the respective blades in order to rotate the blades. The power supply unit supplies power to the driving motors. The control unit controls power supplied from the power supply unit to the driving motors in order to control the flight of the main body. The sensors are installed to correspond to the respective blades in order to detect an obstacle close to the blades by measuring signals. The switch units receive a signal detected by one of the sensors and turn on and off the direct supply of power to a corresponding one of the driving motors so that the power supply unit can increase the output of the driving motor.

Furthermore, in the drone, a corresponding one of the switch units is preferably turned on to increase the output of the driving motor when the difference between signal values detected by sensors corresponding to symmetrical blades is equal to or larger than a set value.

Furthermore, the drone preferably further includes a transmission unit, and the sensors are preferably mounted on the main body in order to receive only signals transmitted from locations outside the main body. The transmission unit is mounted on the main body in order to transmit a signal for the detection of an obstacle.

Furthermore, in the drone, the switch units are preferably further connected to turn on and off power supplied to a driving motor that drives a blade symmetrical to the blade corresponding to the sensor, and a corresponding one of the switch units is preferably turned on such that the symmetrical blade is driven when a signal higher than the signal transmitted from the transmission unit by a predetermined magnitude is detected.

Furthermore, in the drone, the power supply unit preferably includes a first power supply unit and a second power supply unit. The first power supply unit supplies power to the driving motors through the control unit, and the second power supply unit supplies power directly to the driving motors through the switch units.

Advantageous Effects

According to the present invention, when an obstacle is detected by the sensor, power is directly supplied from the power supply to the driving motor that drives the blade corresponding to the sensor, thereby increasing the output of the driving motor. Accordingly, a collision of the drone may be prevented regardless of the control unit that controls the drone.

Furthermore, according to the present invention, when the difference between the signal values detected by the sensors corresponding to the symmetrical blades is equal to or larger than the set value, the switch unit is turned on such that the output of the driving motor is increased. Accordingly, the flight direction of the drone may be prevented from being changed by an interference signal from the outside.

Moreover, according to the present invention, the switch unit is further connected to turn on and off the power supplied to the driving motor that drives the blade symmetrical to the blade corresponding to the sensor, and is turned on such that the symmetrical blade is driven when a signal higher than a signal transmitted from the transmission unit by a predetermined magnitude or more is detected. In this case, the drone may be safely recovered through the transmission of a specific signal to the drone when the drone is moved out of the range of flight or a problem with control occurs.

1: drone 10: main body
20 (20a, 20b, 20c, 20d): blades 30 (30a, 30b, 30c, 30d): driving motors
40: power supply unit 41: first power supply unit
43: second power supply unit 50: control unit
60: transmission unit 70 (70a, 70b, 70c, 70d): sensors
80 (80a, 80b, 80c, 80d): switch units

BEST MODE

An embodiment of a drone having a collision prevention and recovery function according to the present invention will be described with reference to FIGS. 1 and 2.

The drone 1 having a collision prevention and recovery function according to the present invention includes a main body 10, blades 20, driving motors 30, a power supply unit 40, a control unit 50, a transmission unit 60, sensors 70, and switch units 80.

The blades 20 include a plurality of blades 20 mounted on the main body 10. In this embodiment, four blades 20 are mounted on the front, rear, left, and right sides of the main body 10.

The driving motors 30 include a plurality of driving motors 30 mounted on the main body 10 to correspond to the respective blades 20 in order to rotate the blades 20. In this embodiment, four drive motors 30 are mounted to correspond to the blades 20.

The power supply unit 40 functions to supply power to the driving motors 30.

The control unit 50 controls the flight of the main body 10 by controlling the power supplied from the power supply unit 40 to the driving motor 30.

The transmission unit 60 functions to transmit signals f1 for detecting an obstacle, and is mounted on the main body 10.

The sensors 70 function to detect an obstacle approaching the blade 20 by measuring a signal value. To this end, the sensors 70 are mounted on the main body 10 toward a location outside the drone 1 so that they can detect only signals transmitted outside the drone 1 and do not detect signals transmitted from the transmission unit 60 mounted on the main body 10. In addition, the sensors 70 include a plurality of sensors 70 installed to correspond to the blades 20. In this case, the sensors 70 may be installed to correspond to the blades 20 in a 1:1 or N:M correspondence, or only one sensor 70 may be installed. In this embodiment, four sensors 70 are mounted to correspond to the blades 20.

Each of the switch units 80 functions to turn on and off the direct supply of power to the driving motor 30 so that it can receive a signal detected by the sensor 70 and allow the power supply unit 40 to increase the output of the driving motor 30. To this end, the switch units 80 include a plurality of the main body 10 that is mounted. In this case, the switch unit 80 is connected to turn on and off power supplied to the driving motor 30 driving the blade 20 corresponding to the sensor 70 so that the main body 10 does not collide with an obstacle. In this case, when one sensor 70 is mounted, the switch unit 80 is turned on and off based on the strength of a signal detected by the sensor 70.

In the case of the present embodiment, the drone 1 transmits signals f1 for detecting an obstacle from the transmission unit 60 while flying. In this case, in the case where there is an obstacle fixed in direction A relative to the drone 1, when a signal f1 transmitted from the transmission unit 60 collides with and is reflected from the obstacle, it is detected by the sensor 70a corresponding to the blade 20a located in direction A. In this case, since the sensor 70 receives only a signal f1 transmitted from a location outside the main body 10, it does not detect a signal f1 transmitted from the transmission unit 60, but only detects a signal f1 when it collides with an obstacle and is reflected and returned. The switch unit 80a is connected to turn on the power supplied from the power supply unit 40 to the driving motor 30a when an obstacle is detected by the sensor 70a, thereby increasing the output of the driving motor 30a. When the output of the driving motor 30a is increased, the rotational force of the blade 20a is increased such that the main body 10 changes its flight direction to a direction B. In addition, if there is another drone 1 flying in proximity from the direction B relative to the drone 1, the signal f1 transmitted from the drone 1 is detected by the sensor 70b corresponding to the blade 20b located in the direction B. Then, the switch unit 80b is connected to turn on the power supplied from the power supply unit 40 to the driving motor 30b, thereby increasing the output of the driving motor 30b. Then, the rotational force of the blades 20b increases, and thus the main body 10 changes its flight direction to the direction A. Accordingly, regardless of the control unit 50 that controls the drone 1, when an obstacle is detected, the flight direction is changed to prevent a collision with the obstacle.

Figure 3:
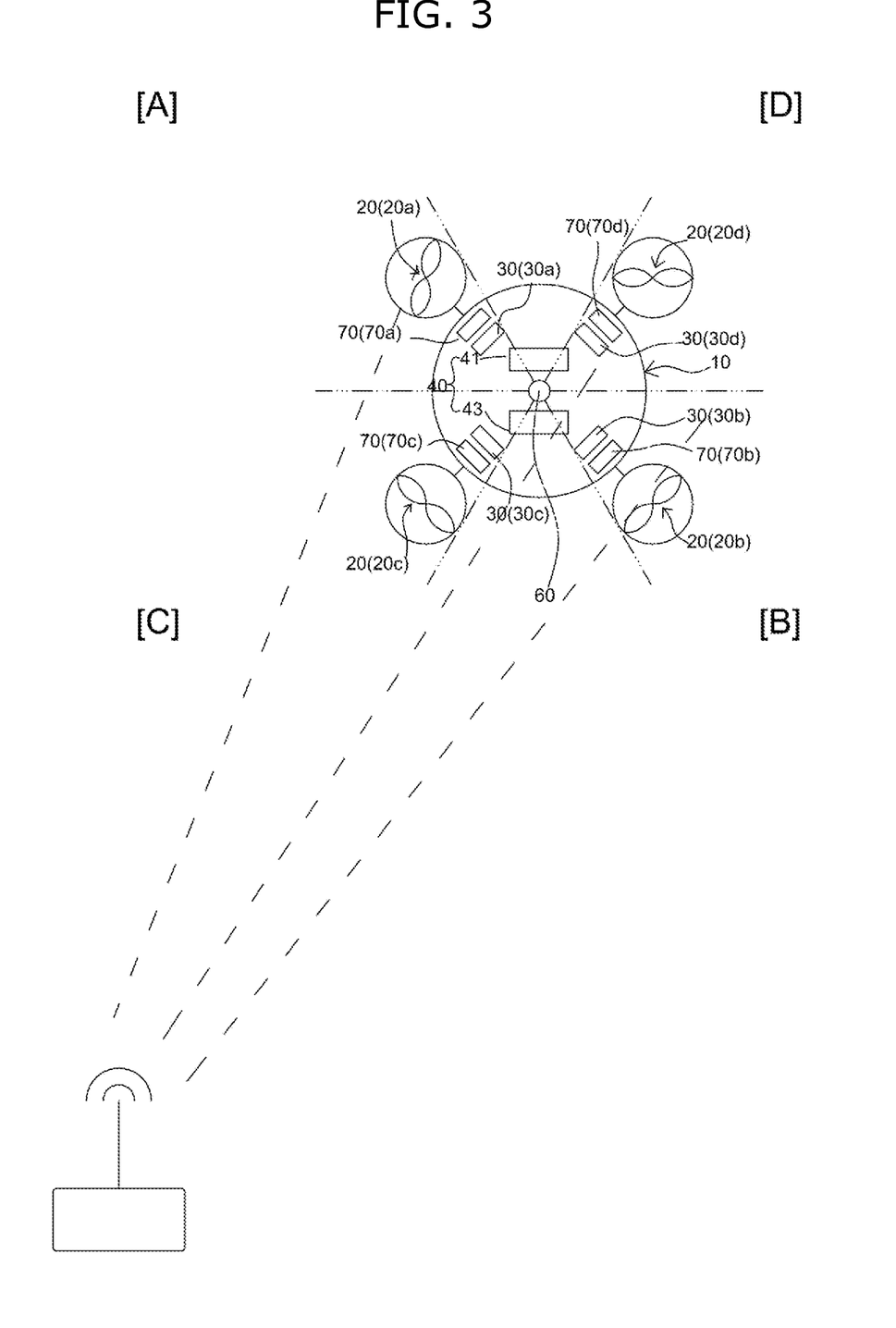
FIG. 3 is a conceptual diagram of another embodiment of a drone having a collision avoidance function according to the present invention.
Figure 4:
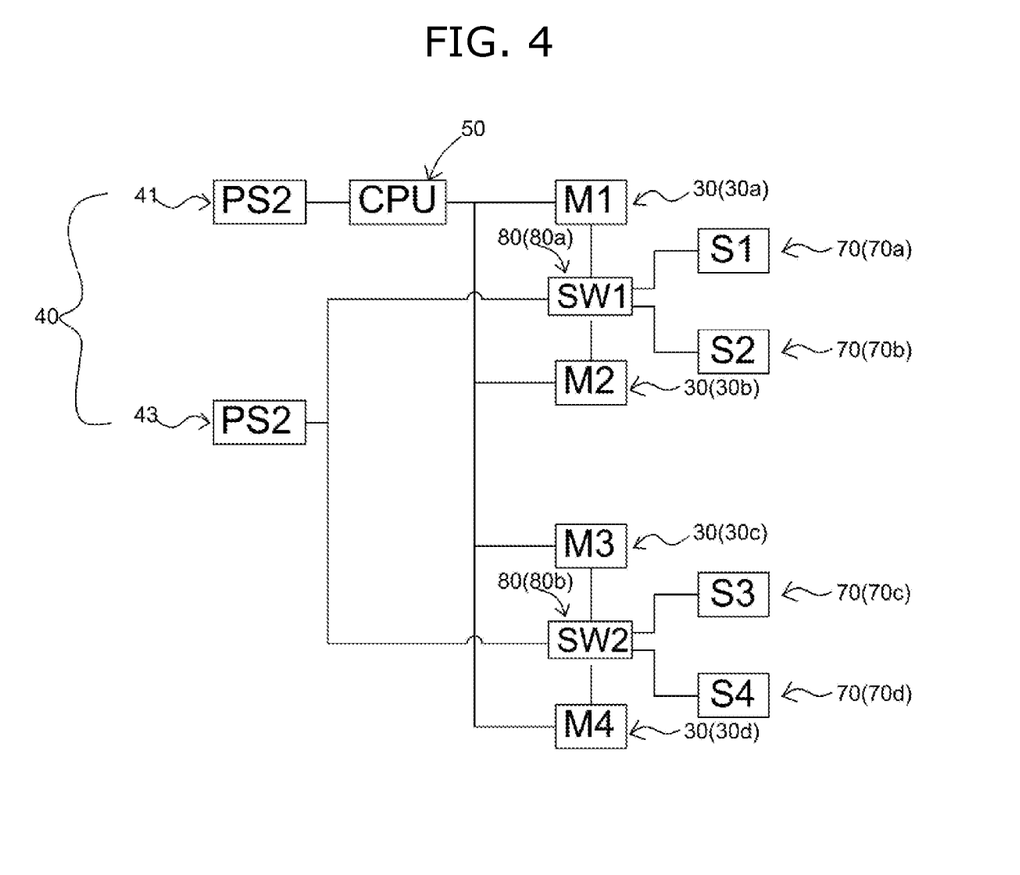
FIG. 4 is a block diagram showing the configuration of the embodiment of the drone shown in FIG. 3.

FIGS. 3 and 4 show another embodiment of a drone having a collision prevention and recovery function according to the present invention. The other embodiment of the drone according to the present invention will be described with reference to FIGS. 3 and 4.

Figure 1:
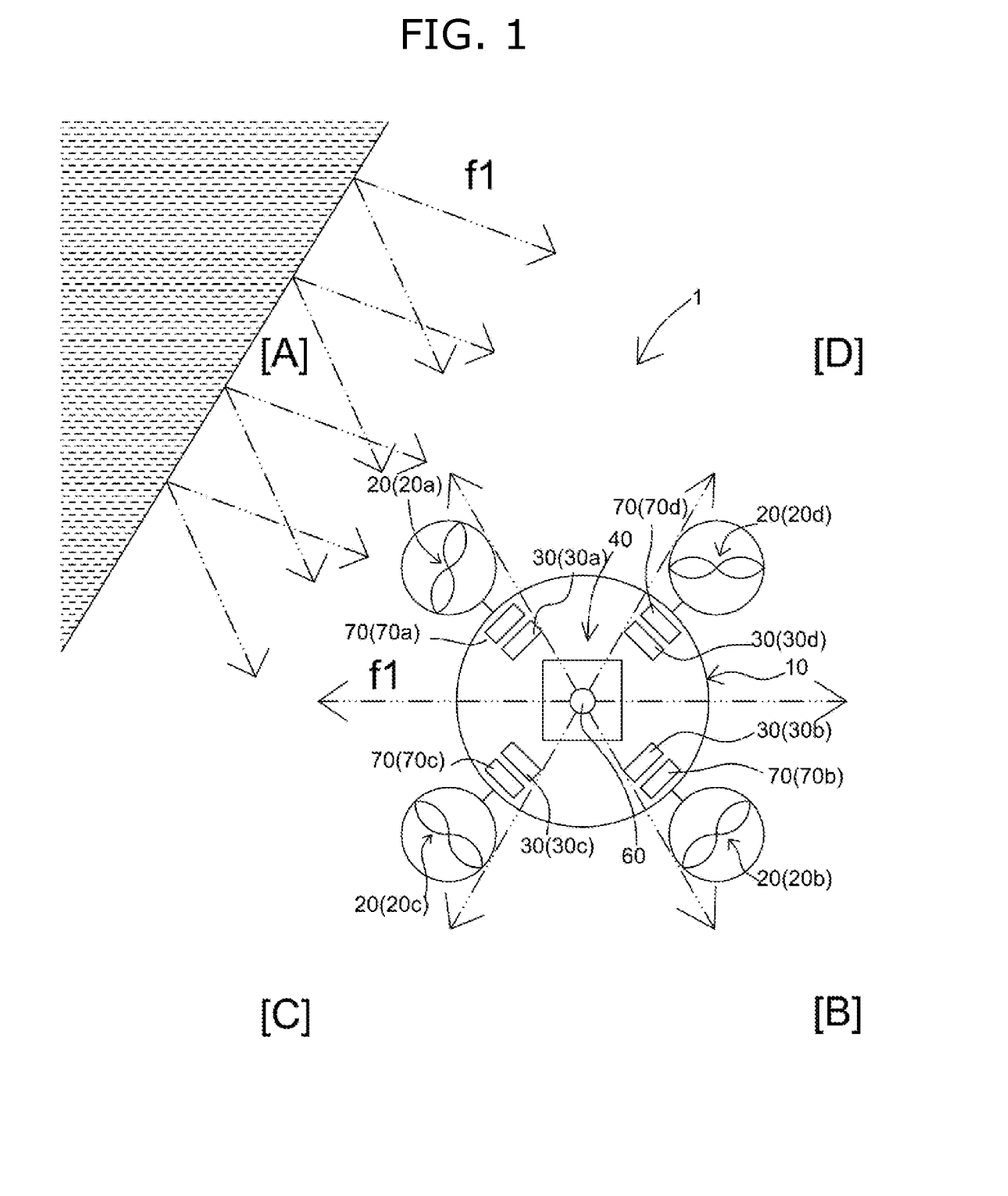
FIG. 1 is a conceptual diagram of an embodiment of a drone having a collision prevention function according to the present invention.
Figure 2:
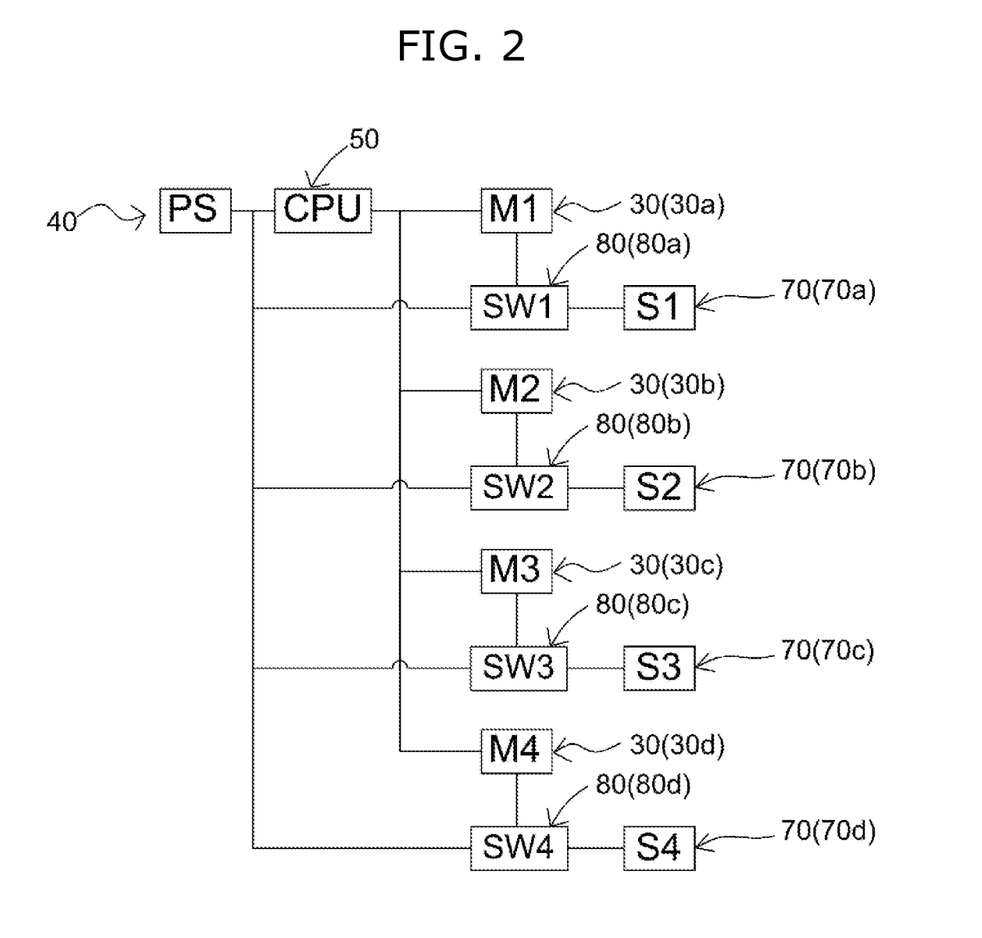
FIG. 2 is a block diagram showing the configuration of the embodiment of the drone shown in FIG. 1.

In the case of the embodiment of FIGS. 1 and 2, when an artificially strong signal is emitted from the outside to the drone 1 in order to capture the drone 1, the signal is detected by the sensor 70 mounted on the drone 1. Then, the switch unit 80 corresponding to the detecting sensor 70 is turned on, and power is supplied from the power supply unit 40 to the driving motor 30. In this case, a problem arises in that the drone 1 is controlled according to a signal emitted from the outside. The embodiment of FIGS. 3 and 4 is intended to prevent this problem.

To this end, in the case of the embodiment shown in FIG. 3, a power supply unit 40 includes a first power supply unit 41 configured to supply power to driving motors 30 through a control unit 50, and a second power supply unit 43 configured to directly supply power to the driving motors 30 through switch units 80. Furthermore, the switch units 80 are turned on such that the output of the driving motors 30 is increased when the difference between the signal values detected by sensors 70a to 70b and 70c to 70d corresponding to symmetrical blades 20a to 20b and 20c to 20d is equal to or larger than a set value. Accordingly, only when the difference between the signal values detected by the two sensors 70a and 70b symmetrical to each other is equal to or larger than a set value is the output of the driving motors 30 increased such that the flight direction of a main body 10 is changed. In this case, when a signal is artificially emitted to the drone 1 from a long distance, the difference between the signal values detected by the two symmetrical sensors 70a and 70b is not large. Accordingly, in the drone 1, the switch unit 80a is not operated by an external artificial signal. However, when an obstacle is detected within a short distance, the difference between the signal values detected by the sensor 70a located in the direction of the obstacle and the sensor 70b corresponding thereto is large, and thus the switch unit 80a may be operated. Since the other components are the same as those of the embodiment shown in FIG. 1, detailed descriptions thereof will be omitted.

In the case of the present embodiment, when an obstacle is detected by the sensor 70c corresponding to a blade 20c located in a direction C during the flight of the drone 1, the switch unit 80 measures a signal value detected by the sensor 70d corresponding to the blade 20d in a direction D symmetrical to the blade 20c in the direction C. In this case, in the case where there is an obstacle in the direction C, when a signal f1 transmitted from a transmission unit 60 and reflected from the obstacle is detected by the sensors 70c and 70d, the difference between the signal values detected by the sensor 70c in the direction C and the sensor 70d in the direction D appears large. Then, a target in question is recognized as an obstacle, the switch unit 80b is operated, and power is supplied from the second power supply unit 43 to the driving motor 30c. In contrast, in the case of an interference signal transmitted from a long distance rather than an obstacle in the direction C, the signal is transmitted from a long distance, and thus the difference between the signal values detected by the sensor 70c in the direction C and the sensor 70d in the direction D appears small. Then, a target in question is not recognized as an obstacle, and thus the switch unit 80b is not operated. Accordingly, the flight direction the drone 1 may be prevented from being changed by an interference signal from the outside. In addition, the power supply unit 40 is divided into and provided as a part configured to supply power to the driving motors 30 through the control unit 50 and a part configured to supply power to the driving motors 30 without intervention of the control unit 50, as in the present embodiment. Alternatively, as in the embodiment of FIGS. 1 and 2, it may be implemented with the single power supply unit 40.

Meanwhile, in FIG. 4, in the case of a recovery signal transmitted from a long distance rather than an obstacle in the direction A, the signal is transmitted from the long distance, the difference between the signal values detected by the sensor 70a in the direction A and the sensor 70b in the direction B appears small. When the difference between the detected signal values is smaller than a set value, the switch unit 80a supplies power from the second power supply unit 43 to the driving motor 30b in the direction B, thereby flying the drone 1 in the direction A.

Figure 5:
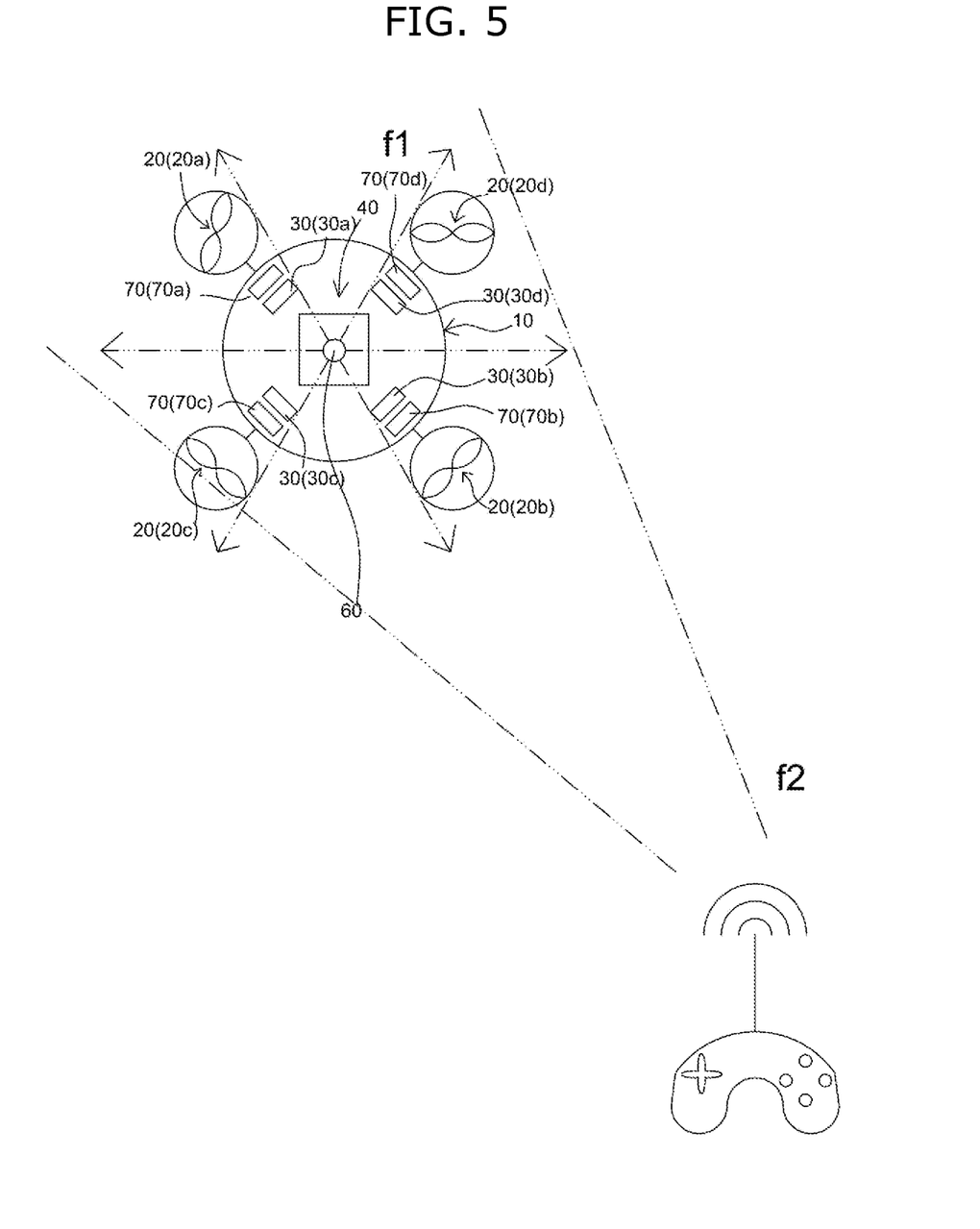
FIG. 5 is a conceptual diagram of still another embodiment of a drone having a collision avoidance function according to the present invention.
Figure 6:
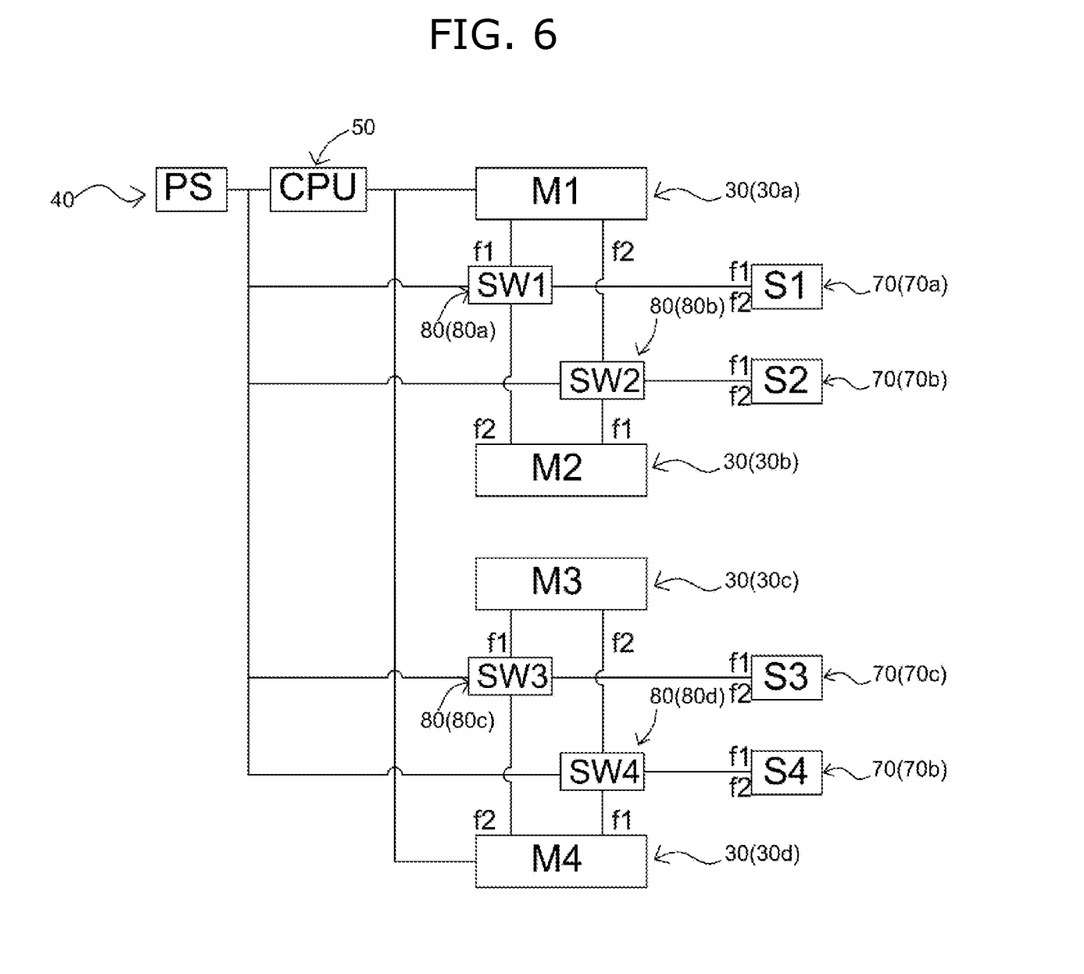
FIG. 6 is a block diagram showing the configuration of the embodiment of the drone shown in FIG. 5.

FIGS. 5 and 6 show still another embodiment of a drone having a collision prevention and recovery function according to the present invention. The present embodiment of the drone according to the present invention will be described with reference to FIGS. 5 and 6.

The embodiment of FIGS. 5 and 6 is intended to recover the drone 1 when the drone 1 is moved out of the range of remote control or a problem with control occurs. To this end, in the case of the embodiment shown in FIG. 5, switch units 80 are connected to turn on and off the power supplied to a drive motor 30a for driving a blade 20a corresponding to a sensor 70a and a driving motor 30b for driving a blade 20b symmetrical to the blade 20a corresponding to the sensor 70a. In this case, when the sensor 70 detects a signal f1 transmitted from the transmission unit 60 (i.e., a signal transmitted from another nearby drone 1, or a signal reflected from an obstacle), the switch unit 80 turns on the power supplied to the driving motor 30a that drives the blade 20a corresponding to the sensor 70a. When the sensor 70 detects a specific signal f2, i.e., a recovery signal, emitted to recover the drone 1 from a long distance, the switch unit 80 turns on the power supplied to the blade 20a corresponding to the sensor 70a. In this case, the specific signal f2 includes all signals each having a shape different from that of the signal f1 transmitted from the transmission unit 60 because not only amplitude, frequency, and phase but also pulse are varied in sound waves or radio waves in various manners. Since the other components are the same as those of the embodiment shown in FIG. 1, detailed descriptions thereof will be omitted.

In the case of the present embodiment, as in the embodiment of FIGS. 1 and 2, when an obstacle is detected by the sensor 70b corresponding to the blade 20b located in the direction B during the flight of the drone 1, the switch unit 80b turns on the power supplied from the power supply unit 40 to the driving motor 30b that drives the blade 20b in the direction B. Then, the output of the drive motor 30b driving the blade in the direction B is increased, so that the rotational force of the blade 20b is increased. When the rotational force of the blade 20b in the direction B increases, the drone 1 changes its flight direction to the direction A.

Meanwhile, when the drone 1 is moved out of the range of flight or a problem with control occurs and the drone 1 needs to be retrieved, a user transmits a specific signal f2 configured to recover the drone 1 to the drone 1. When the specific signal f2 is detected by the sensor 70b corresponding to the blade 20b located in the direction B, the switch unit 80b turns on the power supplied from the power supply unit 40 to the driving motor 30a that drives the blade 20a in the direction A symmetrical to the blade 20b in the direction B. Then, the output of the driving motor 30a driving the blades 20a in the direction A is increased, so that the rotational force of the blade 20a is increased. When the rotational force of the blade 20a in the direction A increases, the drone 1 changes its flight direction to the direction B. Therefore, regardless of the control unit 50 that controls the drone 1, when an obstacle is detected, the flight direction is changed to prevent a collision with the obstacle. Furthermore, when the drone 1 is moved out of the range within which remote control is possible or a problem with control occurs, the specific signal f2 is transmitted to the drone 1, so that the drone 1 can be safely recovered.

The invention claimed is:

1. A drone comprising:
  a main body;
  a plurality of blades mounted on the main body;
  a plurality of driving motors corresponding to the respective blades in order to rotate the blades;
  a power supply unit configured to supply power to the driving motors;
  a control unit configured to control power supplied from the power supply unit to the driving motors in order to control flight of the main body;
  a plurality of sensors installed to correspond to the respective blades in order to detect an obstacle close to the blades by measuring signals; and
  a plurality of switch units configured to receive a signal detected by one of the sensors and turn on and off direct supply of power to a corresponding one of the driving motors so that the power supply unit can increase output of the driving motor;

wherein the switch units are connected to turn on and off power supplied to the driving motor that drives a blade corresponding to the sensor so that the main body does not collide with the obstacle, wherein a corresponding one of the switch units is turned on to increase the output of the driving motor when a difference between signal values detected by sensors corresponding to symmetrical blades is equal to or larger than a set value.

2. A drone comprising:

a main body;

a plurality of blades mounted on the main body;

a plurality of driving motors corresponding to the respective blades in order to rotate the blades;

a power supply unit configured to supply power to the driving motors;

a control unit configured to control power supplied from the power supply unit to the driving motors in order to control flight of the main body;

a plurality of sensors installed to correspond to the respective blades in order to detect an obstacle close to the blades by measuring signals;

a plurality of switch units configured to receive a signal detected by one of the sensors and turn on and off direct supply of power to a corresponding one of the driving motors so that the power supply unit can increase output of the driving motor wherein the switch units are connected to turn on and off power supplied to the driving motor that drives a blade corresponding to the sensor so that the main body does not collide with the obstacle; and a transmission unit mounted on the main body in order to transmit a signal for detection of an obstacle;

wherein the sensors are mounted on the main body in order to receive only signals transmitted from locations outside the main body, wherein the switch units are further connected to turn on and off power supplied to a driving motor that drives a blade symmetrical to the blade corresponding to the sensor, and a corresponding one of the switch units is turned on such that the symmetrical blade is driven when a signal higher than the signal transmitted from the transmission unit by a predetermined magnitude is detected.

3. The drone of claim 1, wherein the power supply unit comprises:

a first power supply unit configured to supply power to the driving motors through the control unit; and a second power supply unit configured to supply power directly to the driving motors through the switch units.

4. The drone of claim 2, wherein the power supply unit comprises:

a first power supply unit configured to supply power to the driving motors through the control unit; and a second power supply unit configured to supply power directly to the driving motors through the switch units.

* * * * *